US011632940B2

(12) United States Patent
Docker et al.

(10) Patent No.: US 11,632,940 B2
(45) Date of Patent: Apr. 25, 2023

(54) OYSTER AQUACULTURE METHOD AND APPARATUS

(71) Applicants: Philip Ian Docker, Nova Scotia (CA); Ernie Porter, Nova Scotia (CA)

(72) Inventors: Philip Ian Docker, Nova Scotia (CA); Ernie Porter, Nova Scotia (CA)

( * ) Notice: Subject to any disclaimer, the term of this patent is extended or adjusted under 35 U.S.C. 154(b) by 771 days.

(21) Appl. No.: 16/450,019

(22) Filed: Jun. 24, 2019

(65) Prior Publication Data
US 2020/0396968 A1    Dec. 24, 2020

(51) Int. Cl.
*A01K 61/55* (2017.01)
*A01K 61/60* (2017.01)
*A01K 80/00* (2006.01)

(52) U.S. Cl.
CPC .............. *A01K 61/55* (2017.01); *A01K 61/60* (2017.01); *A01K 80/00* (2013.01)

(58) Field of Classification Search
CPC ........ A01K 61/54; A01K 61/55; A01K 61/60; A01K 80/00
See application file for complete search history.

(56) References Cited

U.S. PATENT DOCUMENTS

| | | | | |
|---|---|---|---|---|
| 3,672,079 A * | 6/1972 | Masuda | ................... | E02F 3/081 43/6.5 |
| 3,722,126 A * | 3/1973 | Whipple | ................ | A01K 73/06 43/6.5 |
| 3,909,971 A * | 10/1975 | Wilde | ..................... | A01K 61/54 119/237 |
| 4,554,759 A * | 11/1985 | Edling | ................... | A01K 69/08 119/213 |
| 4,831,773 A * | 5/1989 | Rostrom | ................ | A01K 80/00 43/100 |
| 5,165,174 A * | 11/1992 | Brown, Jr. | ............. | A01K 69/06 254/371 |
| 5,400,745 A * | 3/1995 | Saxby | ..................... | A01K 61/54 119/239 |
| 8,230,814 B2 * | 7/2012 | Borne, III | ............. | A01K 61/59 43/4.5 |
| 10,477,874 B1 * | 11/2019 | Martin | .................. | A22C 29/043 |
| 2014/0083365 A1 * | 3/2014 | McShane | ................ | A01K 61/54 119/234 |

* cited by examiner

*Primary Examiner* — Peter M Poon
*Assistant Examiner* — Marisa V Conlon
(74) *Attorney, Agent, or Firm* — Cesari & McKenna, LLP

(57) ABSTRACT

For oyster aquaculture, oysters are housed in cylindrical containers. The containers have open (e.g. mesh) sides allowing water and nutrient flow. Containers are attached at each end to a horizontal anchoring system, such as a pair of lines running near the water surface. The attachment involves rotatable connection, allowing the containers to roll. The containers include a traction surface, such as a ridged or toothed surface for traction, or another roughened or corrugated surface. This allows the containers to be rolled without disconnection from the anchoring system, for tumbling and transport. A container handling device mounted on a boat includes a ramp descending into the water and an operating area. The operating area includes a de-fouling bath and a surface on which the containers roll, facilitating tumbling. The container handling device travels along a line of containers with the anchor lines running overtop, lifting each container up and through the operating area in turn.

16 Claims, 12 Drawing Sheets

900

910 Deploy set of generally cylindrical oyster containers axially rotatably coupled to different respective locations along a horizontal anchoring system.

920 Deploy container handling device, mounted on a boat, in line with horizontal anchoring system and such that lines of the horizontal anchoring system run overtop of the container handling device.

930 Move boat with the container handling device along a main direction of the horizontal anchoring system to cause successive ones of the oyster containers to reach and move onto the container handling device in turn.
-e.g. move boat to cause said successive ones of the oyster containers to reach and move up the ramp and into the operating area in turn
-e.g. move boat includes moving the boat to cause successive ones of the oyster containers to axially rotate while traversing the operating area to cause tumbling of the oysters.
-e.g. move boat is performed in a manner to cause said successive ones of the oyster containers to soak in the de-fouling bath for a prescribed time period.

FIG. 9

OYSTER AQUACULTURE METHOD AND APPARATUS

FIELD OF THE INVENTION

The present invention pertains to the field of aquaculture and in particular to mechanized aquaculture of oysters or similar bivalve molluscs.

BACKGROUND

Oyster aquaculture has traditionally been a highly labor-intensive activity. Oysters grown or finished in floating containers require periodic de-fouling to remove pest organisms. In some systems, this is accomplished by temporarily inverting the containers to dry out and kill the pest organisms while leaving the oysters protected in their shells. Also, in order to give the oysters a more desired curved (rather than flat) shell shape, the oysters are often periodically removed from their containers and tumbled. This process can require significant effort due to the need to remove, tumble, and return the oysters. If overwintering is required, or large storms are approaching, the containers may have to be sunk to the ocean bottom and re-raised. Oysters also require periodic grading, for example to sort by size or quality. Such activities and harvesting, when done manually without the proper tools, can be time-consuming and expensive.

Currently available systems for cultivating oysters, while becoming popular, suffer from a variety of drawbacks. For example, the OysterGro® system offered by Bouctouche Bay Industries Ltd. utilizes rectangular oyster cages suspended from large floats. However, each unit requires significant manual effort to handle. As another example, oyster farming equipment provided by Zapco® Aquaculture includes cylindrical mesh bags suspended from lines and which tumble oysters automatically in response to wave and tidal action. However the parameters of such a tumble are largely out of control of the operator, and other activities such as de-fouling can still require significant manual labour.

Therefore, there is a need for a method and apparatus for oyster aquaculture that overcomes one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for oyster aquaculture.

In accordance with embodiments of the present disclosure, an oyster aquaculture system is provided. The oyster aquaculture system includes a set of one or more generally cylindrical, hollow oyster containers for disposal in water and configured for an axially rotatable coupling to respective locations along a horizontal anchoring system; and a container handling device for mounting on a boat, the boat operable to traverse along a main direction of the horizontal anchoring system, the container handling device having a ramp and an operating area, the ramp configured to receive and raise each of the oyster containers in turn upward from water into the operating area as the boat traverses along the main direction.

In accordance with embodiments of the present disclosure, an oyster container for an aquaculture system is provided. The oyster container includes a generally cylindrical outer surface and a hollow interior exposed through one or more gaps in the outer surface, the outer surface configured for engaging with and traversing a surface of a container handling device portion of the aquaculture system, said engagement imparting axial rotation to the oyster container. The oyster container includes a coupling configured to axially rotatably connect the oyster container to a horizontal anchoring system.

In accordance with embodiments of the present disclosure, an oyster container product for an aquaculture system is provided. The oyster container product includes a generally circular end cap configured for coupling to an end of a mesh bag, along with a second end cap coupled to an opposite end of the mesh bag, to create an oyster container having a generally cylindrical outer surface and a hollow interior exposed through one or more gaps in the outer surface, the outer surface of the oyster container or an outer surface of the end cap configured for engaging with and traversing a surface of a container handling device portion of the aquaculture system, said engagement imparting axial rotation to the oyster container. The end cap and the second end cap each include a coupling configured to axially rotatably connect the oyster container to a horizontal anchoring system. One or both of a pair of end caps can be provided.

In accordance with embodiments of the present disclosure, a container handling device for an oyster aquaculture system is provided. The container handling device is configured for mounting on a boat and is configured to receive and handle a set of generally cylindrical and hollow oyster containers. The container handling device includes a ramp configured for engaging and raising each of the oyster containers in turn upward out of water. The container handling device includes an operating area including a surface configured to engage with an outer surface of each oyster container during traversal through the operating area, the engagement imparting an axial rotation to said each oyster container.

In accordance with embodiments of the present disclosure, an oyster aquaculture method is provided. The method includes deploying a set of generally cylindrical oyster containers axially rotatably coupled to different respective locations along a horizontal anchoring system. The method includes deploying a container handling device, mounted on a boat, in line with the horizontal anchoring system and such that lines of the horizontal anchoring system run overtop of the container handling device. The method includes moving the boat with the container handling device along a main direction of the horizontal anchoring system to cause successive ones of the oyster containers to reach and move onto the container handling device in turn. Moving the boat may include propelling the boat along the lines of the horizontal anchoring system using line haulers.

BRIEF DESCRIPTION OF THE FIGURES

Further features and advantages of the present disclosure will become apparent from the following detailed description, taken in combination with the appended drawings, in which:

FIG. 9 illustrates an oyster aquaculture method provided in accordance with an embodiment of the present invention.

It will be noted that throughout the appended drawings, like features are identified by like reference numerals.

DETAILED DESCRIPTION

Embodiments of the present invention provide for an oyster aquaculture system which incorporates generally cylindrical, rotatable oyster containers connected together via a horizontal anchoring system, and an associated container handling device which, after lifting the oyster containers out of water, rolls the oyster containers along a surface to facilitate tumbling. The oyster containers can be made using mesh (e.g. Vexar®) bags, and are used to grow or finish oysters for consumption. The oysters are contained in the mesh bags, and the mesh provides gaps which expose the hollow interior of the oyster container (and the oysters) to outside water and nutrients. The container handling device can also incorporate a de-fouling station, such as a hot water bath for receiving the oyster containers in turn. De-fouling can include killing of undesired organisms mixed with or growing on the oysters, or removal or neutralizing of other environmental contaminants. In operation, the container handling device, when mounted on a boat, traverses down a line of oyster containers, lifting, de-fouling and tumbling each one in turn before returning it to the water.

Embodiments of the present invention provide for the cylindrical oyster container, and in various embodiments an associated rotatable attachment to an anchoring system, in order to allow rotation of the oyster container about a main axis. The oyster container can be provided as an entire unit or in parts. In some cases, only parts, such as circular end caps, are provided, which are configured in combination with third-party products such as mesh bags, to form a cylindrical oyster container. Embodiments of the present invention also provide for the container handling device, which receives cylindrical oyster containers. The oyster containers travel through the container handling device via rolling, which facilitates at least the tumbling operation. The cylindrical aspect may also allow for easier transport and handling of the containers.

Figure 1:
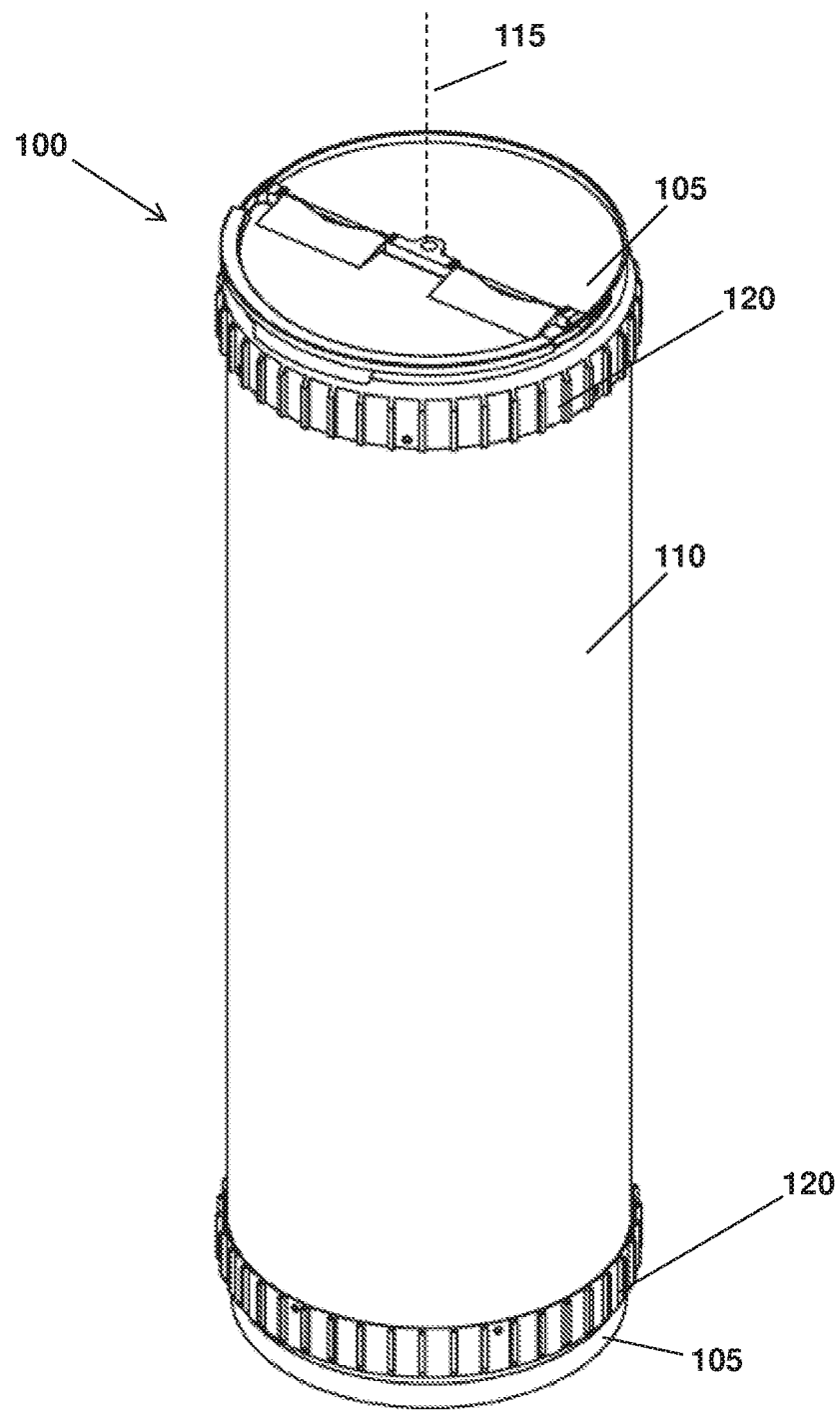
FIG. 1 illustrates an oyster container provided in accordance with an embodiment of the present invention.

FIG. 1 illustrates an oyster container 100 provided in accordance with an embodiment of the present invention. The oyster container is generally cylindrical in shape, with flat end caps 105 at opposite ends thereof. However, it is contemplated that other shapes, such as tapered or bulged end caps can be provided. A notable characteristic is that the oyster container has a sidewall 110 which is curved into a circular shape around a main axis 115, so that the container can be rolled. The rolling can facilitate oyster tumbling, ease of transport, or the like. In operation, oysters are disposed in the container, which is then placed in ocean water so that the oysters can survive. The sidewall 110 can be formed of a mesh open grid structure with openings of a certain size, so that ocean water can move relatively freely in and out of the container through the openings while retaining the oysters therein.

Also shown in FIG. 1 are traction surfaces 120, which in the present embodiment are provided as toothed or ridged surfaces, disposed on outer circumferential edges of the end caps 105. Traction surfaces may also be referred to as grip surfaces. Alternatively, the traction surfaces can be provided as corrugated or roughened surfaces. The purpose of the traction surfaces is to provide traction, for example by facilitating a frictional or mutually enmeshed engagement with another traction surface for example aboard the container handling device. The oyster container's traction surface and the traction surface of the container handling device are placed in contact, with the oyster container and container handling device then moved relatively to one another in a direction perpendicular to the oyster container's main axis. As such, the traction or gripping engagement facilitates or improves a resultant rolling motion of the oyster container, which facilitates tumbling of the oysters.

In various embodiments of the present invention, the oyster container is not necessarily provided as a finished product. Instead, a pair of end caps 105 can be provided for coupling to a separate container body, such as a mesh bag. An example of an appropriate mesh bag is a Vexar® bag which is commonly used to hold oysters in aquaculture. The end caps and mesh bag are connected together to form the cylindrical oyster container. Because of their circular shape, the end caps assist in imparting a cylindrical shape to the overall oyster container. The end caps themselves can function as "wheels" or bearing surfaces which allow the oyster container to roll. Further toward this end, the end caps incorporate the traction surfaces which inhibit slippage and improve the tendency toward rolling motion (thus facilitating oyster tumbling) when the oyster container is drawn over a surface, such as a second traction surface of the container handling device. Due to the mesh bag, the container may be flexible in its center section. Alternatively, the container may be substantially rigid, for example by using a more robust wire frame or providing stiffening rods connecting the two end caps of the container together.

Figure 2A:
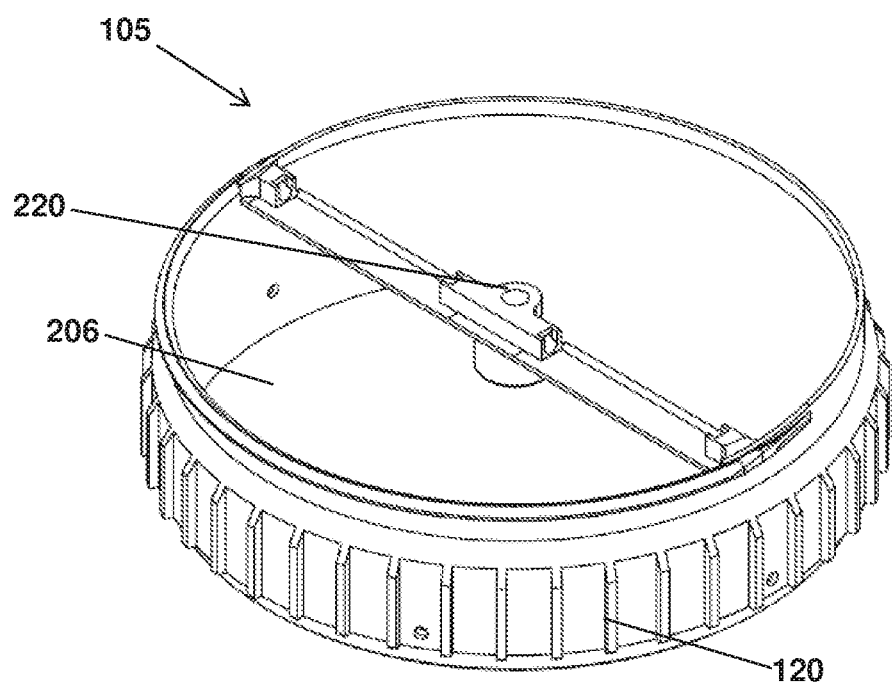
FIG. 2A illustrates an end cap for an oyster container, in accordance with an embodiment of the present invention.
Figure 2B:
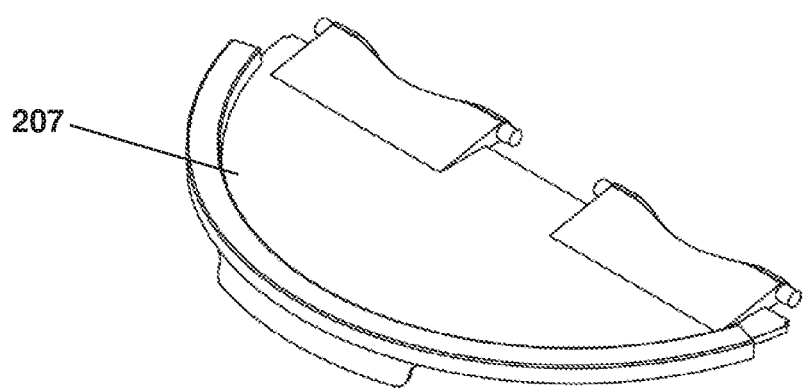
FIG. 2B illustrates a movable door for coupling to the end cap of FIG. 2A.
Figure 3:
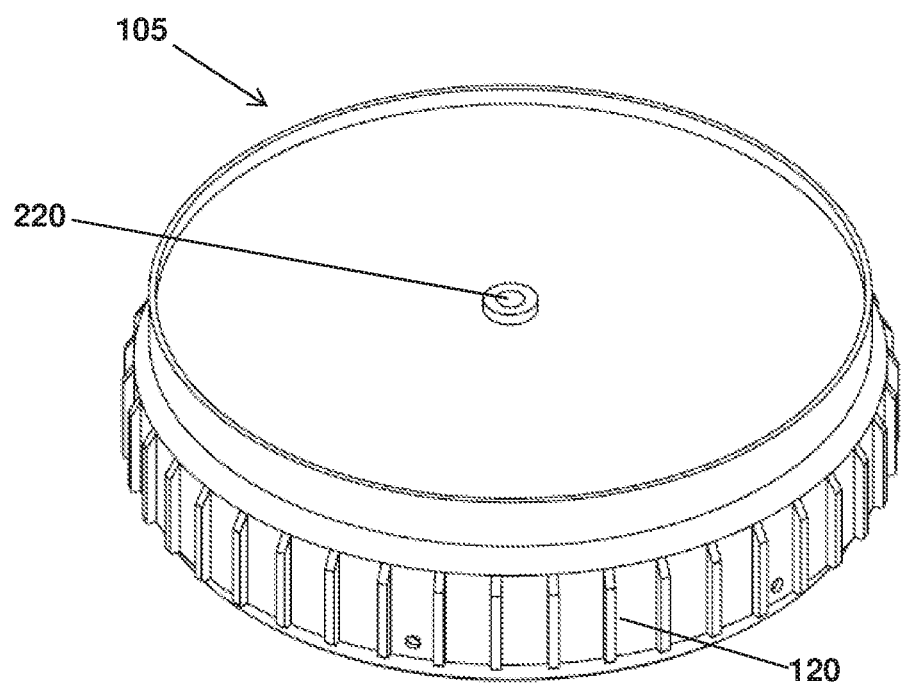
FIG. 3 illustrates another end cap for an oyster container, in accordance with an embodiment of the present invention.

FIG. 2A illustrates a first end cap 105 with an open end having an opening 206 that can be fitted with a movable door 207 as shown in FIG. 2B. The door can be hingedly connected to the end cap, for example using snap-together plastic fitting parts, a metal hinge rod, or another means. FIG. 3 illustrates a second end cap 105 with a closed end. In some embodiments, one of the end caps 105 is as in FIGS. 2A and 2B while the other end cap is as in FIG. 3. However, other configurations are possible. The end caps are generally circular with traction surfaces 120 disposed around their outward-facing circumference. As shown, the traction surfaces 120 incorporate teeth or ridges, which can in some embodiments interact with corresponding teeth or ridges of the second traction surface of the container handling device. The end caps can be about 12 to 14 inches in diameter, and about four inches in height, for example, although other dimensions are also possible.

Also shown in FIGS. 2A and 3 is a centrally located connection aperture 220. A cylindrical post can be inserted into the aperture and connected to a stub line such as a light rope. This stub line can be connected at an opposite end to the horizontal anchoring system. An end of the post can be enlarged so that it remains within the aperture. The post rotates within the aperture to form a type of axle, allowing the end cap and associated container to rotate freely with respect to the post and attached line. This allows the container to roll substantially unimpeded while remaining connected to the horizontal anchoring system. The container can thus rotate while the post does not substantially rotate. This allows a stub line to be connected to the post, such that the stub line does not twist or wind in response to rotation of the container. This aspect can provide for the axially rotatable coupling between the oyster container end cap and the horizontal anchoring system or stub line thereof.

In some embodiments, the containers are configured to float, for example by incorporation of floating material. In some embodiments, the containers do not necessarily float but are suspended in the water at a desired depth range using the horizontal anchoring system. The depth range can be configured using the vertical height and amount of slack in lines of the horizontal anchoring system.

The end caps can be attached to the mesh bag or other cylindrical structure (e.g. wire cage) using a variety of fastening means. For example, plastic push pins can be used to secure the end caps to the mesh bag. As other examples, flexible cable ties, inner and outer mating sleeves trapping a part of the mesh bag within the cap interior, screws, or other fastening means can be used for this purpose.

Figure 4A:
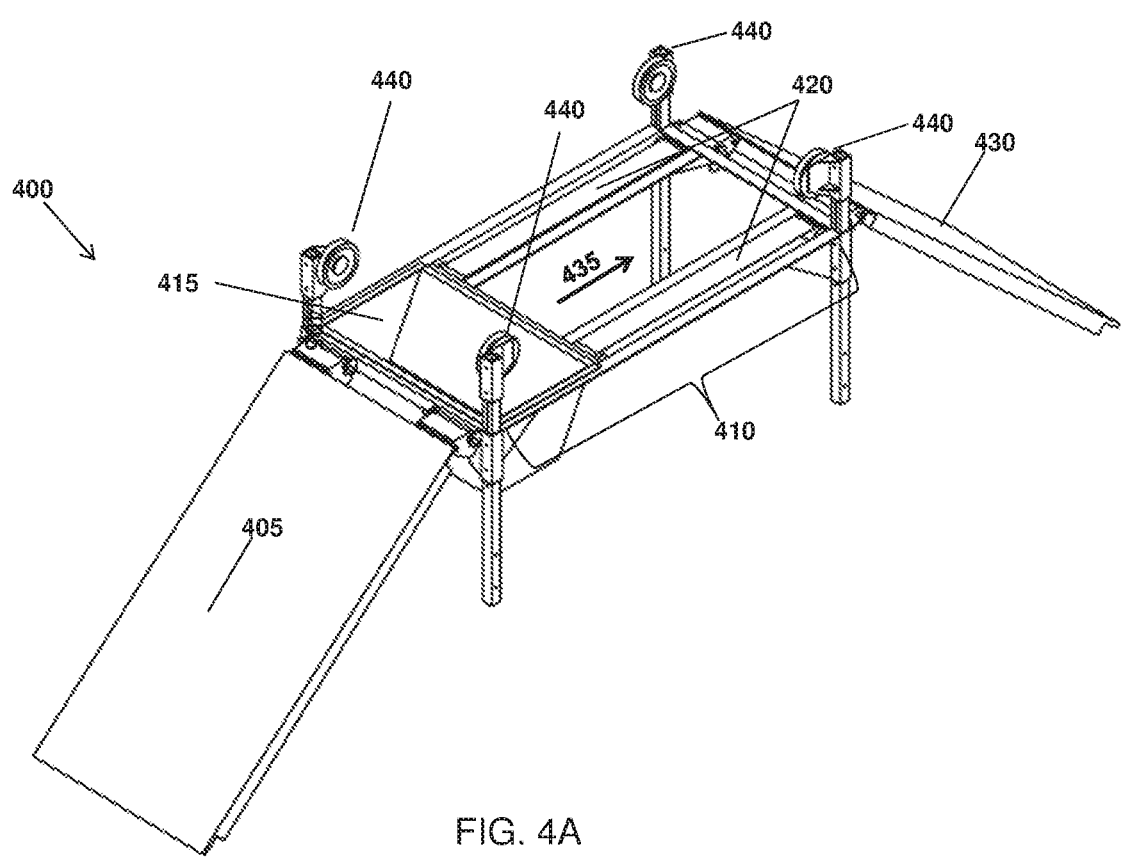
FIG. 4A illustrates a container handling device for an oyster aquaculture system, according to an embodiment of the present invention.

FIG. 4A illustrates a container handling device 400 for an oyster aquaculture system, according to an embodiment of the present invention. The container handling device refers to an apparatus that is used to retrieve and manipulate the oyster containers, such as illustrated in FIG. 1, for example for purposes of some or all of: de-fouling, harvesting, tumbling, grading, inspection, container sinking and re-floating, etc. The container handling device is typically mounted on a boat and is configured to receive and handle a set of generally cylindrical and hollow oyster containers as described above. As also mentioned above, each oyster container may include a first traction surface circumferentially disposed on an outer surface. The container handling device includes a ramp 405 for engaging (receiving) and raising each of the oyster containers in turn upward out of water. One end of the ramp can extend to the water's surface or underneath the water's surface for facilitating the receiving of the oyster containers. The container handling device includes an operating area 410 including a second traction surface 420 configured to engage with the first traction surface of each oyster container during traversal through the operating area in order to impart an axial rotation to said each oyster container.

As illustrated, the container handling device 400 also includes a second ramp 430 for receiving each of the oyster containers after traversing the operating area 410, and for returning the oyster containers downward into the water.

As illustrated, the operating area 410 also includes a de-fouling bath 415 configured to receive each of the oyster containers in turn and to hold and soak the oyster container in a de-fouling solution, such as a hot water solution. The de-fouling can be performed by soaking for a prescribed period of time. To achieve this period an oyster container can be held stationary or nearly stationary relative to the container handling device. The de-fouling bath 415 can include a sloped sidewall which facilitates passage of an oyster container out of the de-fouling bath by generally moving (relative to the container handling device) the oyster container in the direction 435.

After exiting the de-fouling bath, the oyster container contacts the second traction surface 420. The second traction surface may include teeth, ridges, or other gripping means. The first traction surface(s) of the oyster container contact the second traction surface(s) 420 in the operating area, thus causing the oyster container to roll when relatively pulled in the direction 435. This rolling executes a tumbling of the oysters, which is known to assist in shaping the oysters to a more desirable, less flat shape. The length of the second traction surface, and the speed at which the oyster container is caused to roll, dictates the duration and intensity of the tumble. As such, the tumble is controllable by selection of appropriate dimensioning of equipment and operating speeds.

In some embodiments, the second traction surfaces 420 are provided in the form of two conveyor belts with upper surfaces moving counter to the relative direction of the oyster container. The conveyor belts may be powered continuous belts, as would be readily understood by a worker skilled in the art. That is, the conveyor belts may move opposite to the direction 435. The motion of these conveyors increases the tumbling rate. In some embodiments, the speed of the conveyors in combination with the speed of the container moving in the direction 435 provides for a tumbling rate of about 40 rpm. One or both of the conveyor speeds and the container speed can be adjusted (e.g. by adjusting the boat speed) to provide for a desired tumbling rate. The tumbling rate can be made to be sufficiently energetic to cause removal of new growth from the leading edges of the oyster shell. As such, the combination of the container motion (relative to the container handling device) and the motion of the conveyors may provide for oyster container tumbling.

Although the ramps 405, 430 are shown as separate from the operating area 410, it should be understood that the operating area can alternatively be integrated into one or both of the ramps. This may result in a V-shaped or curved-shaped container handling device rather than one with a central, horizontal operating area.

As illustrated, the container handling device 400 also includes post extensions to which line guides 440 can be mounted, such that the line guides are disposed above and at opposite side edges of the operating area 410. The line guides may be provided as pulley wheels, or other systems which adequately hold lines in place and allow the container handling device to move along the lines. In operation, horizontal lines of an anchoring system which anchor the oyster containers in place can be mounted on or threaded through the line guides. Then, as the boat and container handling device 400 traverse along a main direction of the anchoring system, the lines move through the line guides, causing successive sections of the lines, and oyster containers connected thereto, to be lifted up and over the container handling device. As such, the oyster containers traverse up the ramp 405 and through the operating area 410.

The line guides can incorporate wheels, starwheels, roller bearings, channels, or other means for retaining lines within the line guides while allowing for relatively unimpeded motion of the line through the line guides as the container handling device is moved. In various embodiments, the oyster containers are suspended at different locations between two parallel lines. This is done by providing two stub lines per container. A first stub line is connected to a first end of the oyster container using a freely axially rotatable connector. The connector can comprise a cylindrical pin rotatably fitted into the connection aperture 220 located at the center of the oyster container end cap, for example. The first stub line is then also connected to one of the lines which is fitted into one of the line guides. A second stub line can be similarly connected between a second, opposite end of the oyster container and the second line which is fitted into the other of the line guides.

Figure 4B:
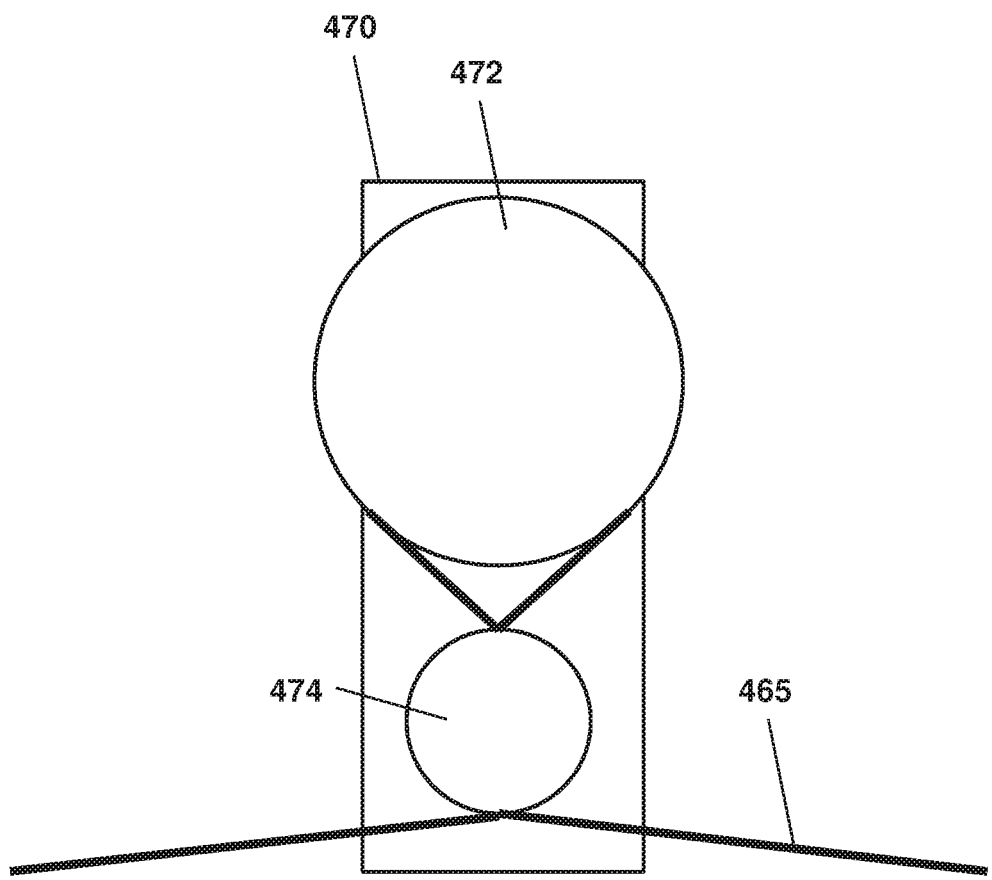
FIG. 4B illustrates a portion of the device of FIG. 4A comprising a line hauler for propelling a boat, according to an embodiment of the present invention.

FIG. 4B illustrates a portion of the device of FIG. 4A comprising a line hauler 470 for propelling a boat, according to an embodiment of the present invention. Some or all of the wheeled line guides 440 may be configured as line haulers. Alternatively, one or more line haulers may be provided separately from the line guides 440, either coupled to one of the pair of lines or to an additional line, not shown. A line 465 is threaded through the line hauler, which grips the line and rotates through action of a connected motor. This rotation causes the line 465 to move through the line hauler. Because the line is anchored, the line hauler, and hence the apparatus and boat connected thereto, travel rather than the line. The line hauler 470 includes two wheels 472, 474, at least one of which (e.g. 472) is powered by a motor. The line 465 is wound around the two wheels in order to provide for gripping engagement, as would be readily understood by a worker skilled in the art.

Figure 5A:
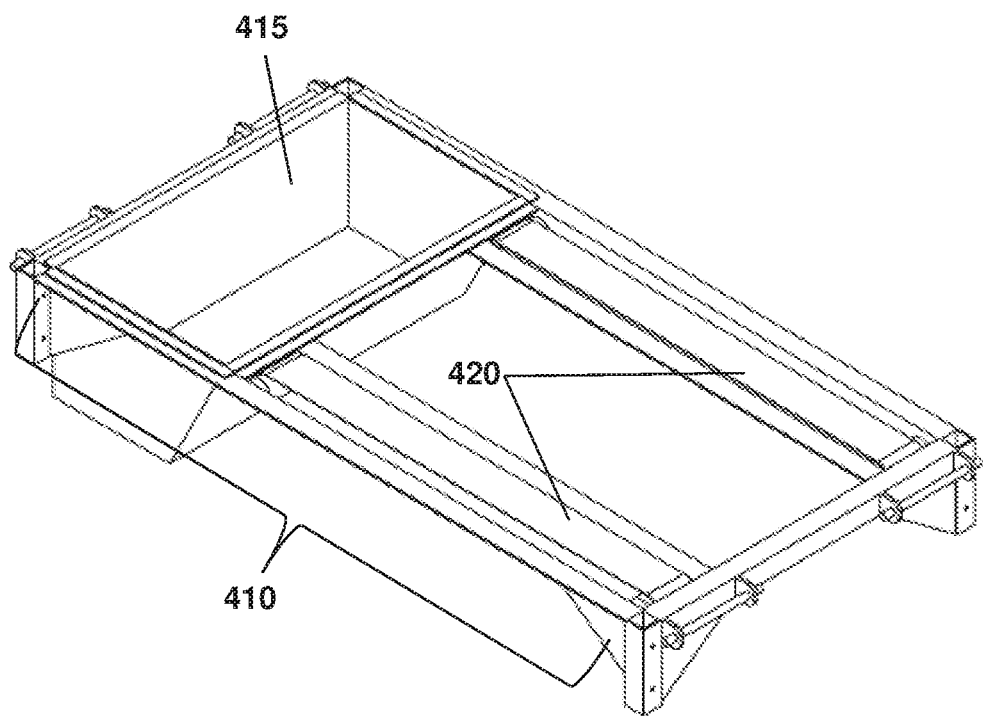
FIG. 5A illustrates an operating area of the container handling device of FIG. 4A.

FIG. 5A illustrates a top view of the operating area 410, including the de-fouling bath 415 and the second traction surface 420. FIG. 5A also more clearly illustrates the second traction surface 420 being the moving surface of a set of powered, typically synchronized moving conveyor belts.

Figure 5B:
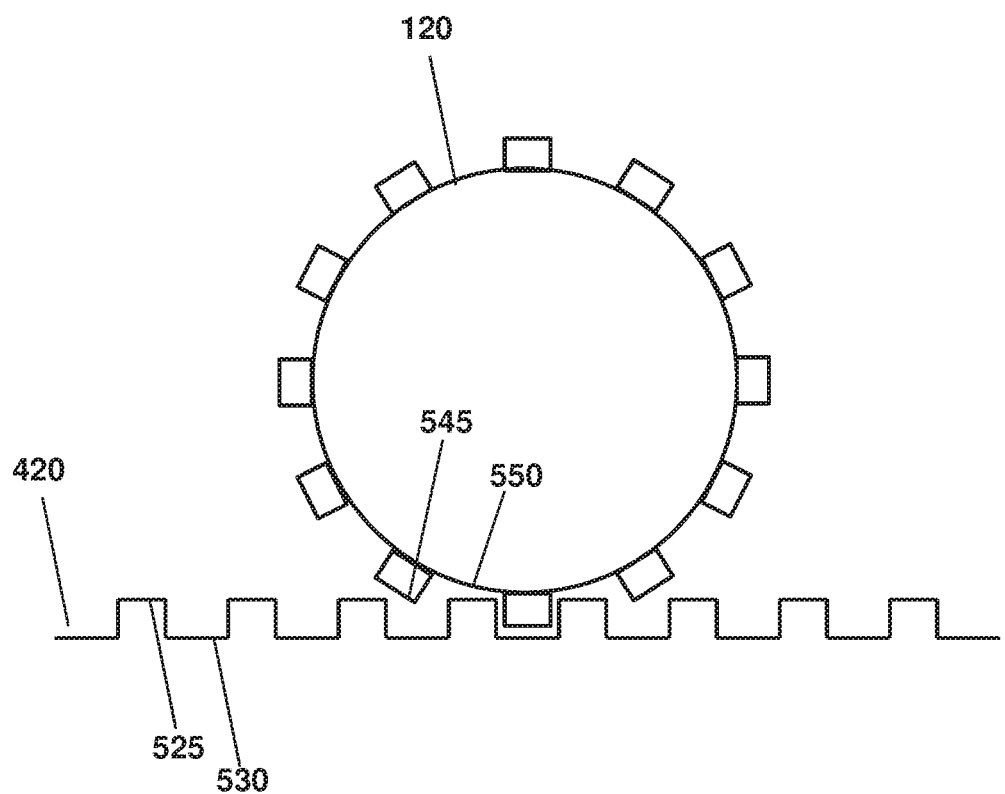
FIG. 5B illustrates mating traction surfaces of oyster container and container handling device, according to an embodiment of the present invention.

FIG. 5B illustrates mating traction surfaces of oyster container and container handling device, according to an embodiment of the present invention. In this case, the second traction surface 420, which may be the surface of a moving conveyor belt, has spaced-apart ridges 525 separated by corresponding grooves 530. The first traction surface 120 on the oyster container also have spaced-apart ridges 545 separated by corresponding grooves 550. The ridges 525, 545 are sized to fit in the respective grooves 550, 530 as shown.

Figure 6:
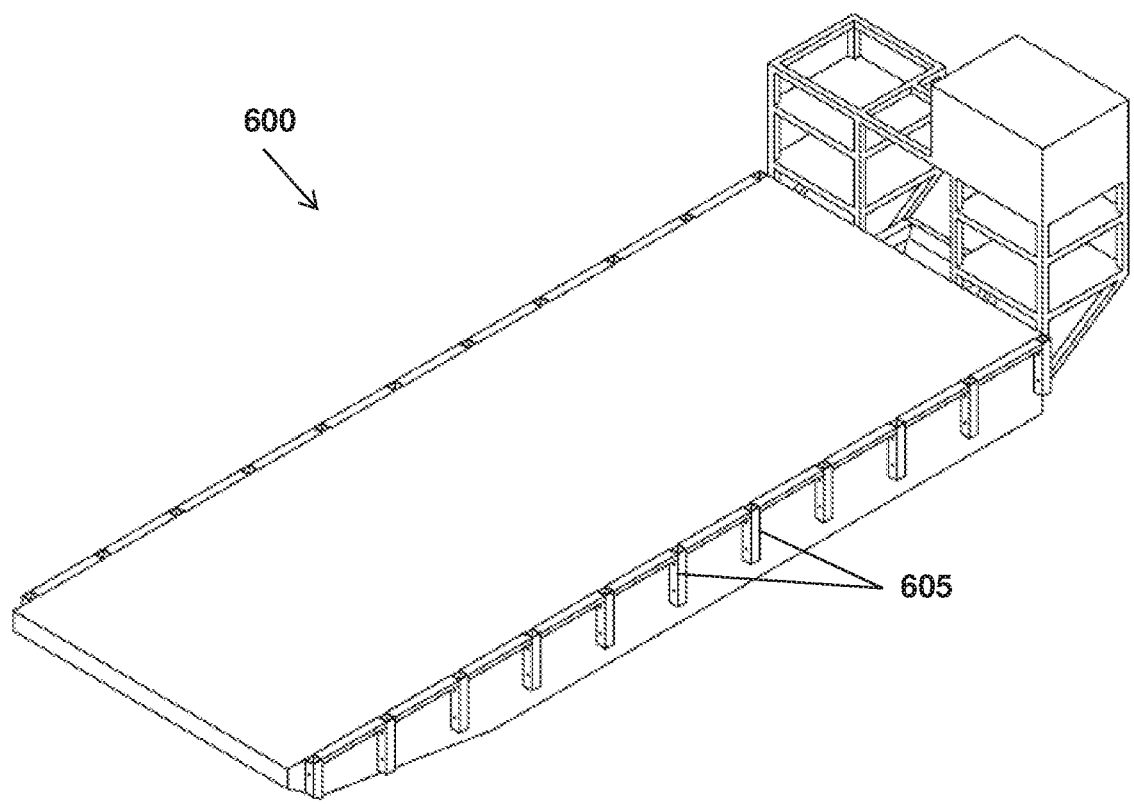
FIG. 6 illustrates a boat to which the container handling device can be mounted, according to an embodiment of the present invention.

FIG. 6 illustrates a boat 600 to which the container handling device can be mounted, according to an embodiment of the present invention. The boat includes a plurality of open post holes 605 along side edges thereof. Posts of the container handling device can be mounted into the post holes 605. Ramps of the container handling device then extend over the sides of the boat and downward into the water, while the operating area of the container handling device may be located above the body of the boat.

In some embodiments, as mentioned above with respect to FIG. 4B, one or more line haulers can be attached to the boat and connected to a respective one or more of the parallel lines of the horizontal anchoring system, or to a separate line running parallel to the horizontal anchoring system and co-anchored therewith at one or both ends. The line haulers can, for simplicity, be considered as part of the container handling device, even though they may be physically separate. The line haulers can grip and move along one or more of the lines in order to propel the boat without use of a conventional motor (e.g. propeller). The line haulers can be used to draw the boat along a row of oyster containers with limited disturbance. The line haulers can include wheels or rollers which press against their corresponding lines, and when rotating, move along such lines. A motor can be connected to the wheels or rollers to motivate such rotation, thus moving the boat. The line haulers may also employ starwheels or similar means for gripping the lines while allowing stub lines connected thereto to pass through the line haulers.

As an alternative, the separate line running parallel to the horizontal anchoring system may be connected in a continuous loop, and the line moved using a motor, in a similar manner to a cable car. The boat can be removably connected to the line, which then draws the boat along the path of the horizontal anchoring system. Of course, a conventional propeller or jet motor can also be used to propel the boat in some embodiments.

Figure 7A:
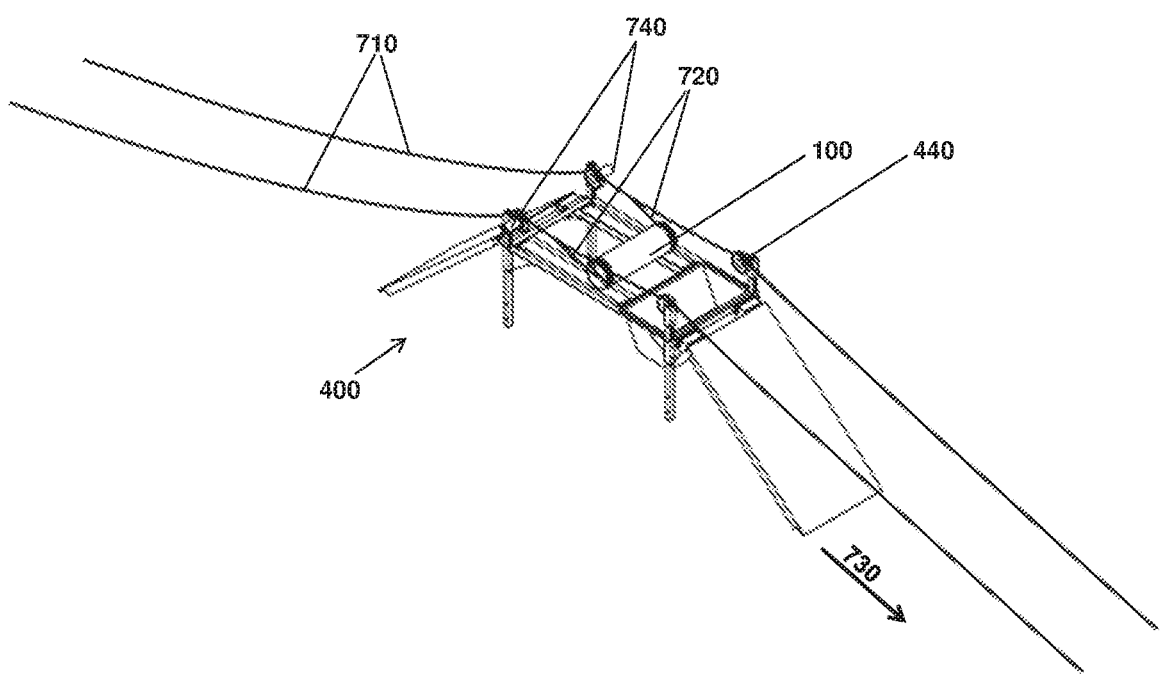
FIG. 7A illustrates operation of the container handling device, according to an embodiment of the present invention.

FIG. 7A illustrates the container handling device 400 handling an oyster container 100, according to an embodiment of the present invention. Lines 710 of the horizontal anchoring system are disposed to pass through the line guides (e.g. corresponding to line guides 440 in FIG. 4, one of which is also labelled in FIG. 7A) and thus overtop of the container handling device 400. The oyster container 100 is connected to the lines 710 via a pair of stub lines 720. The oyster container is freely rotatably connected to the stub lines via a pivotable connection at its axis 115 (see FIG. 1), allowing the cylindrical oyster container to move along the surfaces of the container handling device. The lines 710 are anchored at either end (not shown), and the container handling device 400, mounted to a boat, moves along and underneath the lines, allowing the oyster container to pass up one ramp, through the operating area, and down the opposite ramp. The container handling device moves in the direction 730.

Figure 7B:
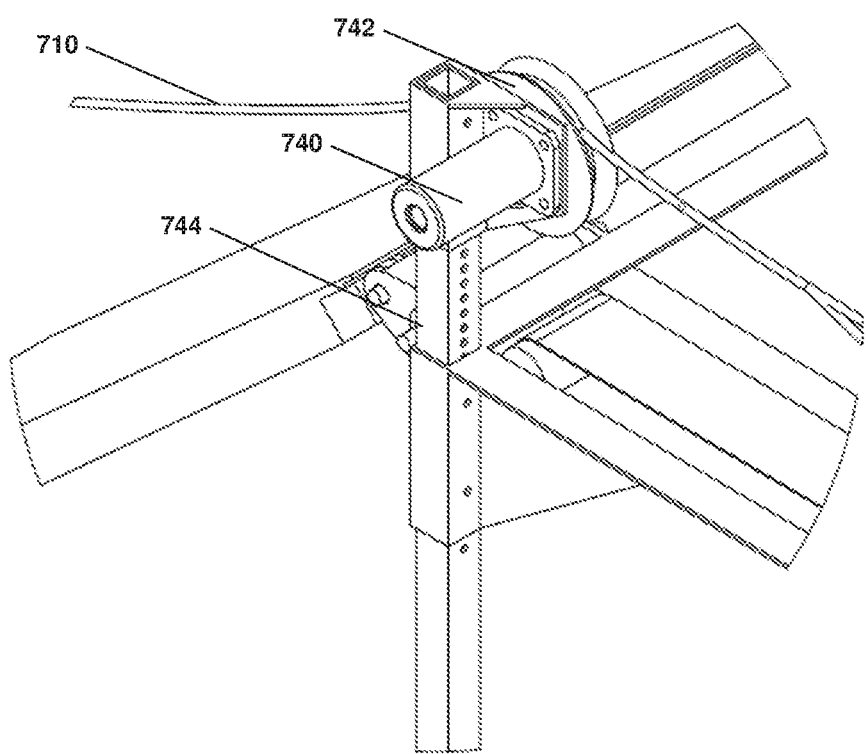
FIG. 7B illustrates a line hauler device detail of FIG. 7A.

In the embodiment of FIG. 7A, two of the line guides 440 are driven by motors 740, such as but not necessarily hydraulic or electric motors. The addition of these motors transforms the line guides into line haulers which are capable of propelling the container handling device and boat along the lines. FIG. 7B illustrates such a line hauler in more detail. The line hauler includes the motor 740 rotatably driving a corresponding wheel 742, with the motor and wheel mounted at the top of a post 744. The line 710 is engaged with the wheel 742, possibly wrapped one or more times around the wheel to enhance grip. Operation of the motor rotates the wheel, which in turn traverses down the line in a given direction.

Figure 8:
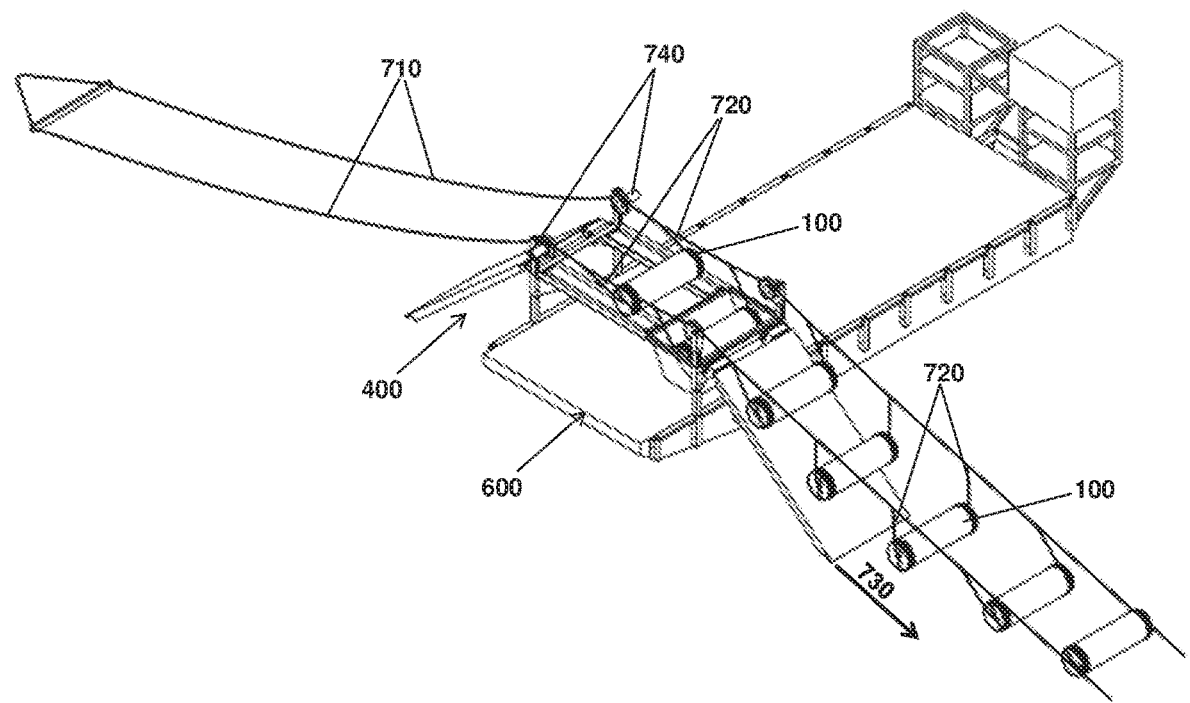
FIG. 8 illustrates operation of the container handling device, according to another embodiment of the present invention.

FIG. 8 illustrates a system comprising various components as described above. A plurality of oyster containers 100 are connected in a spaced-apart configuration to the lines 710 of the horizontal anchoring system via stub lines 720. The container handling device is mounted on a boat 600, moves in the direction 730 and handles the different oyster containers in series.

Having reference now to FIG. 9, there is provided an oyster aquaculture method 900. The method includes deploying 910 a set of generally cylindrical oyster containers axially rotatably coupled to different respective locations along a horizontal anchoring system. The method further includes deploying 920 a container handling device, mounted on a boat, in line with the horizontal anchoring system and such that lines of the horizontal anchoring system run overtop of the container handling device. The method further includes moving 930 the boat with the container handling device along a main direction of the horizontal anchoring system to cause successive ones of the oyster containers to reach and move onto the container handling device in turn.

In various embodiments, the container handling device includes a ramp and an operating area. In this case, moving 930 the boat includes moving the boat to cause said successive ones of the oyster containers to reach and move up the ramp and into the operating area in turn. In some various further embodiments, each of the oyster containers includes a first traction surface circumferentially disposed on an outer surface thereof, and the operating area includes a second traction surface configured to engage with the first traction surface. In this case, moving 930 the boat includes moving the boat to cause successive ones of the oyster containers to axially rotate while traversing the operating area to cause tumbling of the oysters. In the same or other further embodiments, the operating area includes a de-fouling bath, and moving 930 the boat is performed in a manner to cause said successive ones of the oyster containers to soak in the de-fouling bath for a prescribed time period, for example by controlling the speed of the boat, either as a constant or a variable speed.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An oyster aquaculture system comprising:
a horizontal anchoring system, comprising first and second lines generally parallel to one another and extending along a main direction, from a body of water to a boat;
a set of generally cylindrical, hollow oyster containers for disposal in the water, each of the oyster containers extending from a first container end to a second container end along a main cylinder axis, each of the oyster containers including a first rotatable connector for connecting the first container end to the first line, and a second rotatable connector for connecting the second container end to the second line, wherein the first and second rotatable connectors facilitate an axial rotation of each of the oyster containers along the horizontal anchoring system while maintaining a horizontal position of the oyster containers; and
a container handling device for mounting on the boat, the boat operable to traverse along the main direction of the horizontal anchoring system, the container handling device having a ramp and an operating area, the ramp configured to receive and raise each of the oyster containers in turn upward from water into the operating area as the boat traverses along the main direction, the axial rotation caused at least in part by said traversal of the boat along the main direction relative to the oyster containers, the axial rotation being about the main cylinder axis of each of the oyster containers, which is generally perpendicular to the main direction, the axial rotation causing an oyster tumbling action.

2. The system of claim 1, wherein each of the oyster containers includes a first traction surface circumferentially disposed on an outer surface thereof, and wherein the operating area includes a second traction surface configured to engage with the first traction surface to impart the axial rotation to the oyster container during traversal.

3. The system of claim 2, wherein the first traction surface and the second traction surface are toothed or ridged surfaces.

4. The system of claim 2, wherein the second traction surface comprises one or more conveyors configured to move opposite to a direction of motion of the oyster container during traversal.

5. The system of claim 1, wherein the operating area comprises a de-fouling bath configured to receive each of the oyster containers in turn and to hold and soak the oyster container for de-fouling thereof.

6. The system of claim 1, wherein the ramp is separate from the operating area, or wherein the ramp and the operating area are at least partially integrated.

7. The system of claim 1, wherein the first and second lines of the horizontal anchoring system are anchored at each end.

8. The system of claim 1, wherein the container handling device further comprises a pair of line guides disposed overtop of the ramp and the operating area, the pair of line guides configured to receive and guide the pair of lines overtop of the container handling device as the boat traverses along the main direction.

9. The system of claim 1, wherein the container handling device further comprises one or more line haulers configured to grip a respective one or more of the pair of lines or another line parallel and co-anchored with the pair of lines, the one or more line haulers configured to move along said gripped lines or said gripped another line to move the boat.

10. An oyster aquaculture system comprising:
a horizontal anchoring system, comprising first and second lines generally parallel to one another and extending along a main direction, from a body of water to a boat, the boat operable to travel along the main direction when handling a set of oyster containers;
a container handling device for mounting on a boat and configured to receive and handle the set of generally cylindrical and hollow oyster containers, each of the oyster containers extending from a first container end to a second container end along a main cylinder axis, the container handling device comprising:
a ramp extending along the main direction and configured for engaging and raising each of the oyster containers in turn upward out of water while each of the oyster containers is axially rotatably connected to the horizontal anchoring system to facilitate an axial rotation of each of the oyster containers while maintaining a horizontal position of the oyster containers; and
an operating area including a surface configured to engage with an outer surface of each oyster container during traversal through the operating area, the engagement comprising a horizontal motion of the container handling device relative to each oyster container due to travel of the boat, the engagement further imparting the axial rotation to said each oyster container,
the axial rotation being about the main cylinder axis, of said each oyster container, which is generally perpendicular to the main direction, the axial rotation causing an oyster tumbling action.

11. The container handling device of claim 10, wherein the surface in the operating area is a traction surface configured to engage with the outer surface of each oyster container.

12. The container handling device of claim 10, wherein the surface in the operating area comprises one or more conveyors configured to move opposite to a direction of motion of each of the oyster containers during traversal.

13. An oyster aquaculture method, comprising:
deploying a set of generally cylindrical oyster containers axially rotatably coupled to different respective locations along a horizontal anchoring system, the horizontal anchoring system comprising first and second lines generally parallel to one another and extending along a main direction, from a body of water to a boat, each of the set of oyster containers extending from a first container end to a second container end along a main cylinder axis and being axially rotatable about said main cylinder axis to cause an oyster tumbling action while maintaining a horizontal position of said each oyster container;
deploying a container handling device, mounted on the boat, in line with the horizontal anchoring system and such that the first and second lines of the horizontal anchoring system run overtop of the container handling device; and
moving the boat with the container handling device along the main direction of the horizontal anchoring system to cause successive ones of the oyster containers to reach and move onto the container handling device in turn, the main direction being generally perpendicular to the main cylinder axis of said each of the set of oyster containers, said moving the boat causing said successive ones of the oyster containers to axially rotate about said main cylinder axis while traversing the operating area to cause tumbling of the oysters.

14. The method of claim 13, wherein the container handling device includes a ramp and an operating area, the method further comprising moving the boat to cause said successive ones of the oyster containers to reach and move up the ramp and into the operating area in turn.

15. The method of claim 13, wherein each of the oyster containers includes a first traction surface circumferentially disposed on an outer surface thereof, and wherein the operating area includes a second traction surface configured to engage with the first traction surface.

16. The method of claim 13, further comprising propelling the boat using one or more line haulers to grip the lines of the horizontal anchoring system or another line parallel and co-anchored with the horizontal anchoring system, the line haulers drawing the boat along the gripped lines or the gripped another line.

* * * * *